(12) United States Patent
Silc et al.

(10) Patent No.: US 9,330,812 B2
(45) Date of Patent: May 3, 2016

(54) METHOD AND APPARATUS FOR COMMUNICATING BETWEEN CAB INTERIOR AND EXTERIOR CHASSIS OF TRUCK

(71) Applicant: Alliance Wireless Technologies, Inc., Houston, TX (US)

(72) Inventors: Ron Silc, Houston, TX (US); Kelly Genzer, Houston, TX (US)

(73) Assignee: Alliance Wireless Technologies, Inc., Houston, TX (US)

( * ) Notice: Subject to any disclaimer, the term of this patent is extended or adjusted under 35 U.S.C. 154(b) by 173 days.

(21) Appl. No.: 14/136,071

(22) Filed: Dec. 20, 2013

(65) Prior Publication Data

US 2014/0102784 A1  Apr. 17, 2014

Related U.S. Application Data

(63) Continuation-in-part of application No. 12/473,875, filed on May 28, 2009, now abandoned.

(51) Int. Cl.
*H01B 7/00* (2006.01)
*H01R 9/03* (2006.01)
*B60D 1/64* (2006.01)

(52) U.S. Cl.
CPC .............. *H01B 7/0045* (2013.01); *B60D 1/64* (2013.01); *H01R 9/03* (2013.01); *Y10T 29/49117* (2015.01)

(58) Field of Classification Search
CPC .................................................... H01B 11/04
USPC ............................................. 174/33, 113 R
See application file for complete search history.

(56) References Cited

U.S. PATENT DOCUMENTS

| | | | | |
|---|---|---|---|---|
| 4,567,756 A | * | 2/1986 | Colborn | 73/114.61 |
| 5,268,644 A | * | 12/1993 | Klassen et al. | 324/503 |
| 5,997,320 A | * | 12/1999 | DeMello | 439/148 |
| 6,121,551 A | * | 9/2000 | Dobrow | 174/113 R |
| 6,483,200 B1 | * | 11/2002 | Jacobs | 307/10.1 |
| 8,642,890 B2 | * | 2/2014 | Silc et al. | 174/113 R |

* cited by examiner

*Primary Examiner* — Chau N Nguyen
(74) *Attorney, Agent, or Firm* — Kevin Soules; Kermit D. Lopez; Luis M. Ortiz

(57) ABSTRACT

A method and apparatus for communicating between the cab interior and exterior chassis of a truck comprises a custom-designed multi-conductor cable having a plurality of circuits. Each multi-conductor cable is terminated at each end with non-proprietary connectors and fabricated into a harness of a length that is truck brand and model specific determined by the truck manufacturer and carry various communication functions between the cab interior and the distal exterior truck cab.

13 Claims, 3 Drawing Sheets

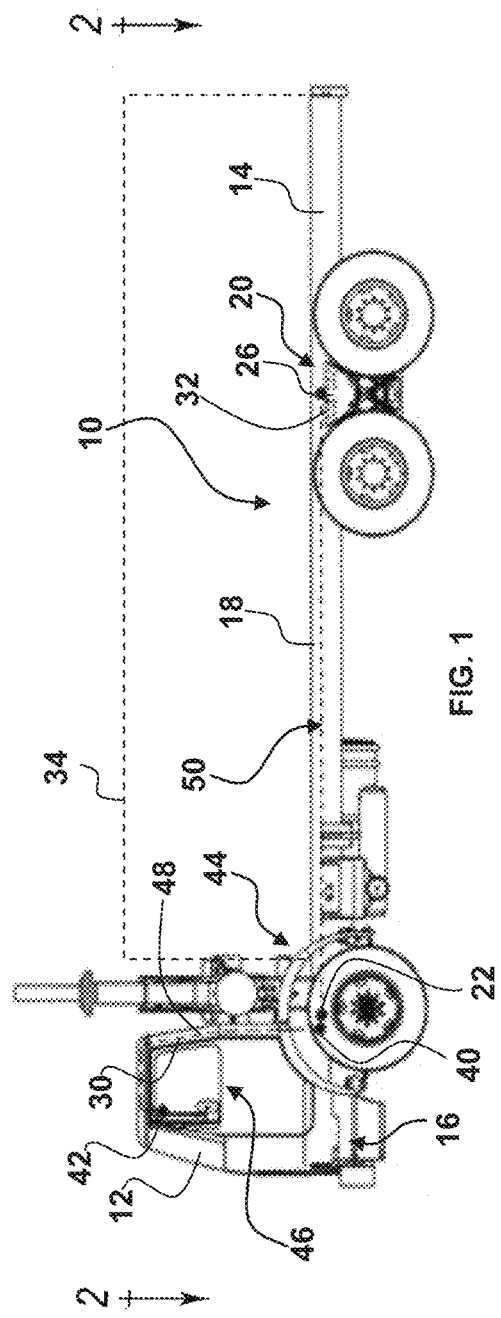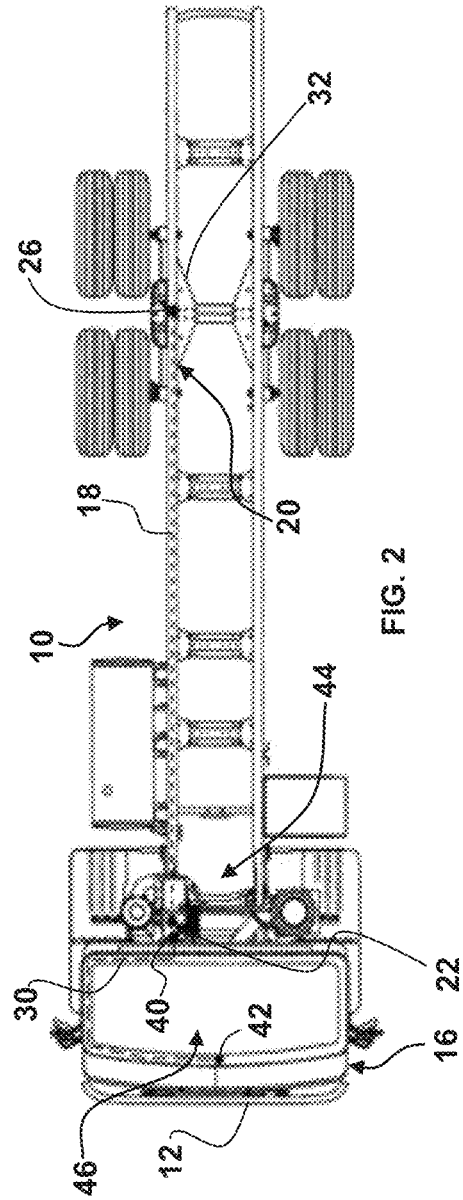

METHOD AND APPARATUS FOR COMMUNICATING BETWEEN CAB INTERIOR AND EXTERIOR CHASSIS OF TRUCK

CROSS-REFERENCE TO PATENT APPLICATION

This patent application is a Continuation-in-Part of U.S. patent application Ser. No. 12/774,636 entitled "Method and Apparatus for Communicating Between a Cab and Chassis of a Truck," which was filed on May 5, 2010 and is incorporated herein by reference in its entirety.

FIELD OF THE INVENTION

Embodiments are generally related to a method and apparatus for communicating between the inside cab and exterior chassis of a truck. Embodiments are also directed to the establishment of electrical connections between various circuits and functions that may be found in, for example, a truck cab.

BACKGROUND

Manufacturers of truck chassis often install cables in a wire loom on each truck chassis to facilitate later installation of and connection to cables run by truck body manufacturers. Likewise, it is common for truck body manufacturers to install cables in truck components, which can be mated to a cable and connector specified by particular types of video safety cameras and radar sensors in order to allow battery DC power, ground, video and audio signals to pass through the same cable. Typically, cables are added to a body and a chassis separately and then connected. In some cases, cables are added individually and often in bundles for each discrete function desired on the truck.

There exists a need for an improved apparatus and method to establish connection between various circuits and functions that may be found in the truck which provides better connectivity between truck cab interior and exterior truck chassis.

It is apparent now that numerous innovations for cables have been provided in the prior art that are adequate for various purposes. Furthermore, even though these innovations may be suitable for the specific individual purposes to which they address, accordingly, they would not be suitable for the purposes of the present invention as heretofore described.

SUMMARY

The following summary is provided to facilitate an understanding of some of the innovative features unique to the disclosed embodiment and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for a method and apparatus for communicating between a truck cab interior and an exterior truck chassis.

It is another aspect of the disclosed embodiments to provide for a method and apparatus for communicating between a truck cab interior and an exterior truck chassis, which integrates, for example, video, audio, radar, and data components in the context of a single harness.

It is still another aspect of the disclosed embodiments to provide for a method and apparatus for communicating between a truck cab interior and exterior a truck chassis in the context of an after-market implementation.

The aforementioned aspects and other objectives and advantages can now be achieved as described herein. A method and apparatus to communicate between the truck cab interior and exterior truck chassis with a custom-designed multi-conductor cable having a plurality of circuit is disclosed. In one example embodiment, each conductor cable is terminated at each end with non-proprietary connectors and fabricated into a harness of a length that is truck brand and model specific determined by the truck manufacturer and carry various communication functions between the cab interior and the distal exterior truck cab.

In another example embodiment, an apparatus for communicating between a truck cab interior and an exterior chassis of a truck can include at east one multi-conductor cable having a plurality of circuits, wherein the multi-conductor extends the length of the truck cab interior and the exterior chassis of the truck to carry communication functions between the truck cab interior and a distal end of the exterior chassis of the truck. The multi-conductor cable can include a first multi-conductor cable for connecting a proximal end of the exterior chassis of a truck and the distal end of the chassis of a truck and a second multi-conductor cable for connecting the exterior proximal end of the chassis of a truck and the truck cab interior. The first multi-conductor cable can include a first cable bundle having a first socket connector at the proximal end of the chassis of a truck and a first pin connector at the distal end of the chassis of a truck. The first pin connector can be electrically connected to a wiring system at the distal end of the chassis of a truck.

In another example embodiment, a method for communicating between a truck cab interior and an exterior chassis of a truck can include steps or operations such as, for example: mounting at least one multi-conductor cable comprising a first multi-conductor cable and a second multi-conductor cable, wherein the multi-conductor cable comprises a plurality of circuits and extends the length of the truck cab interior and the exterior chassis of a truck; electrically connecting a first connector of the first multi-conductor cable to a wiring system at a distal end of the exterior chassis of a truck and a second pin connector of the second multi-conductor cable to a wiring system inside the truck cab interior; electrically connecting the second pin connector of the second multi-conductor cable to a first socket of the first multi-conductor cable; and allowing the multi-conductor cable to carry various communication functions between the truck cab interior and the distal end of the exterior chassis of a truck, wherein the second multi-conductor cable is fabricated into a harness of a length that is truck brand and model specific determned by the truck manufacturer.

In yet another example embodiment, a system for communicating between a truck cab interior and an exterior chassis of a truck can include least one multi-conductor cable havng a plurality of circuits, wherein the multi-conductor cable extends the length of the truck cab interior and the exterior chassis of the truck to carry communication functions between the truck cab interior and a distal end of the exterior chassis of the truck. The multi-conductor cable can include a first multi-conductor cable for connecting a proximal end of the exterior chassis of a truck and the distal end of the chassis of a truck and a second multi-conductor cable for connecting the exterior proximal end of the chassis of a truck and the truck cab interior. The first multi-conductor cable can include a first cable bundle having a first socket connector at the proximal end of the chassis of a truck and a first pin connector at the distal end of the chassis of a truck. The first pin connector can be electrically connected to a wiring system at the distal end of the chassis of a truck.

In another example embodiment, the first multi-conductor cable can include a first cable bundle having a first socket connector at said proximal end of said chassis of a truck and a first pin connector at said distal end of said chassis of a truck, and said first pin connector can be electrically connected to a wiring system at said distal end of said chassis of a truck.

It is to be understood that both the foregoing general description and the following detailed description are exemplary and explanatory only and are intended to provide further explanation of the invention as claimed. The accompanying drawings are included to provide a further understanding of the invention and are incorporated in and constitute part of this specification, illustrate several embodiments of the invention and together with the description serve to explain the principles of the disclosed embodiments.

BRIEF DESCRIPTION OF THE FIGURES

The accompanying figures, in which like reference numerals refer to identical or functionally-similar elements throughout the separate views and which are incorporated in and form a part of the specification, further illustrate the disclosed embodiments and, together with the detailed description of the invention, serve to explain the principles of the disclosed embodiments.

FIG. 1 illustrates a side view of a truck with an apparatus installed for communicating between the interior of the truck cab and a truck chassis, in accordance with a preferred embodiment;

FIG. 2 illustrates a top view of the truck shown in FIG. 1, in accordance with a preferred embodiment;

DETAILED DESCRIPTION

Figure 3:
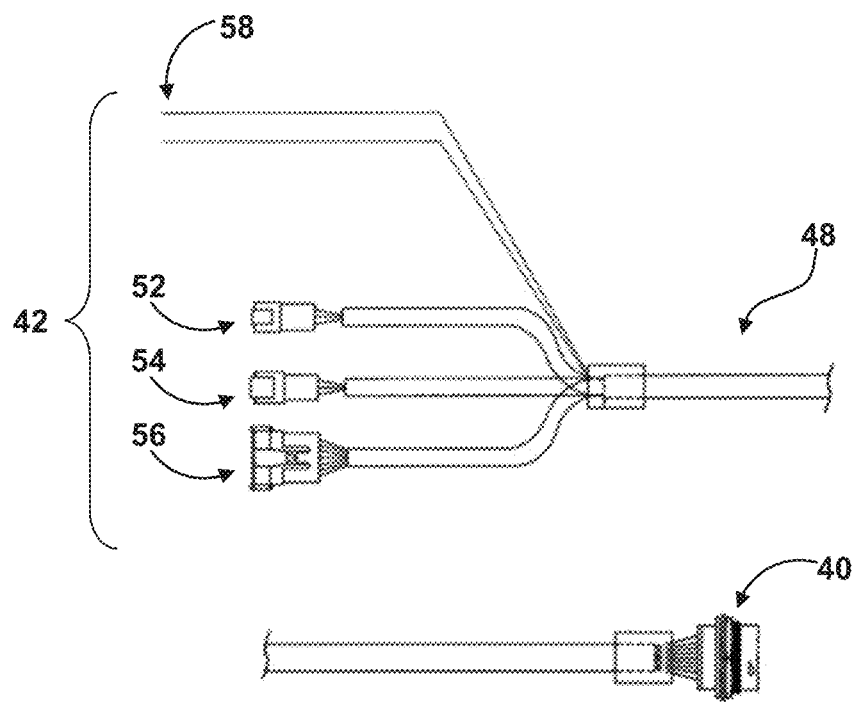
FIG. 3 illustrates a perspective view of cab pre-wire harness before being installed within the truck, in accordance with the disclosed embodiments.

The particular values and configurations discussed in these non-limiting examples can be varied and are cited merely to illustrate at least one embodiment and are not intended to limit the scope thereof.

The embodiments will now be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete, and will fully convey the scope of the invention to those skilled in the art.

FIG. 1 illustrates a side view of a truck 16 with an apparatus 10 installed for communicating between the interior of the truck cab 12 and the truck chassis 14, in accordance with a preferred embodiment. The apparatus 10 includes a multi-conductor cable 50 that includes a plurality of circuits. The cable 50 extends substantially along the length of the chassis 14 to the interior 46 of the cab 12 to carry various communication functions between the interior of cab 12 and a distal end 20 of the chassis 14.

The multi-conductor cable 50 can include, for example, a first multi-conductor cable 18 for connecting a proximal end 44 and distal end 20 of chassis 14 and a second multi-conductor cable 48 for connecting exterior proximal end 44 of chassis 14 and interior of truck cab 12. The first multi-conductor cable 18 can include a first cable bundle (not shown) having first socket connector 22 at a proximal end 44 of chassis 14 and a first pin connector 26 at distal end 20 of chassis 14. The first pin connector 26 can be electrically connected to a wiring system 32 at the distal end 20 of the chassis 14.

The second multi-conductor cable 48 can include a second cable bundle (not shown) having a second pin connector 40 at the proximal end 44 of chassis 14 connected to first socket connector 22 and second socket connector 42 connected to truck cab interior 46. The second socket connector 42 is electrically connected to a wiring system 30 in the cab 12. The second multi-conductor cable 48 is fabricated into a harness of a length that is truck brand and model specific determined by the truck manufacturer.

Note that the circuits of the multi-conductor cable 50 can be configured in some instances as a twenty-one cable bundle having five 18 AWG insulated conductors and four jacketed 22 AWG quads with two shielded pairs in each quad. Preferably, the cable is a multi-conductor cable designed to carry low voltage DC power, ground, video, audio, and data. The cable 50 can perform as a "pass-through" cable with connectors, and is capable of carrying both analog and digital signals and adaptable, for example, J-1939/CAN. It can be appreciated, of course, that such parameters are merely discussed for exemplary purposes only and are not considered limiting features of the disclosed embodiments.

To provide communication between the cab interior 46 and the chassis 14 of the truck 16, the first multi-conductor cable 18 can be initially mounted along the length of the chassis 14 between the cab 12 and the distal end 20 of the chassis 14 before the body 34 of the truck 16 is attached to the chassis 14. Then, the second multi-conductor cable 48 can be connected to the first multi-conductor cable 18.

The first pin connector 26 of first multi-conductor cable 18 can be electrically connected to a wiring system 32 at the distal end 20 of the chassis 14 and second pin connector 40 of second multi-conductor cable 48 is electrically connected to a wiring system 30 inside the cab 12.

Then, a second pin connector 42 of second multi-conductor 48 can be electrically connecting to first socket 22 of first multi-conductor cable 18. This allows multi-conductor cable 50 to carry various communication functions between the cab interior 46 and distal exterior truck cab 12.

The first multi-conductor cable 18 with the circuits having the twenty-one bundle can be run in the chassis 14 prior to the body 34 being placed on the chassis 14. The first multi-conductor cable 18 may also be put in place after the body 34 has been installed, but the routing of the multi-conductor cable 18 will be more difficult to accomplish in such a situation. The second multi-conductor cable 48 can be connected to interior of cab either prior to the body 34 being placed on the chassis 14 or after placing the body 34 on the chassis 14. Thus, the multi-conductor cable 50 can provide a single universal harness with generic connectors 22, 26, 40, and 42 that functions as a communications backbone between the cab interior 46 and chassis 14 at distal end 20.

DEUTSCH connectors, for example, which are standard in the truck industry, can terminate at each end of the first and second multi-conductor cable 18 and 48, providing easy access and economical connectivity for imaging technology, sensors, and various information technologies. However, departure from the DEUTSCH connectors to another connector for a given use is possible and can be implemented in the context of other embodiments. For example, without limitation, a 3$^{rd}$ eye advanced truck safety exterior component interface adapter (not shown) can be utilized to indicate how the DEUTSCH connector can be employed to interface and adapt to a radar sensor. If the radar sensor connector interface is changed, the 3$^{rd}$ eye advanced truck safety exterior component interface connector would remain the same and only the radar sensor connector would be changed.

Note that in some example embodiments, the second multi-conductor cable 48 can also be referred as cab pre-wire harness because it can be utilized in the cab interior for making various connections inside the cab. The first multi-conductor cable 18 can also be referred to as chassis rail cable because it is capable of being utilized along the length of the chassis.

Figure 4:
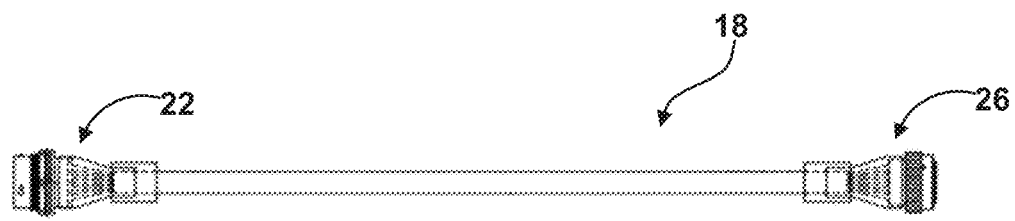
FIG. 4 illustrates a perspective view of chassis rail cable before being installed within the truck, in accordance with the disclosed embodiments.

FIG. 3 illustrates a perspective view of cab pre-wire harness (second multi-conductor cable 48) before being installed within the truck 16, in accordance with an example embodiment. FIG. 4 illustrates a perspective view of chassis rail cable (first multi-conductor cable 18) before being installed within the truck, in accordance with an example embodiments. In some example embodiments, the first and second multi-conductor cables 18 and 48 can comprise, for example, five 18 AWG insulated conductors and four jacketed 22 AWG quads with two shielded pairs in each quad.

The first pin and socket connectors 26 and 22 of first multi conductor cable 18 are shown in FIG. 4. FIG. 3 shows the second multi conductor cable 48 with second pin and socket connectors 40 and 42, respectively. Note that the second socket connector 42 has a plurality of socket connectors 52, 54, and 56 and battery and ground connection 58 for providing 12 V DC power and ground for the radar system within the cab 12.

The arrangement of the multi-conductor cable 50 is clearly depicted and appreciated by reference to FIGS. 1 through 4. The construction of the multi-conductor cable 50 provides significant advantages including that all the twenty-one circuits may be run inside a single casing of the multi-conductor cable 50 and providing ease of identification and placement in the chassis 14 of the truck 16.

Figure 5:
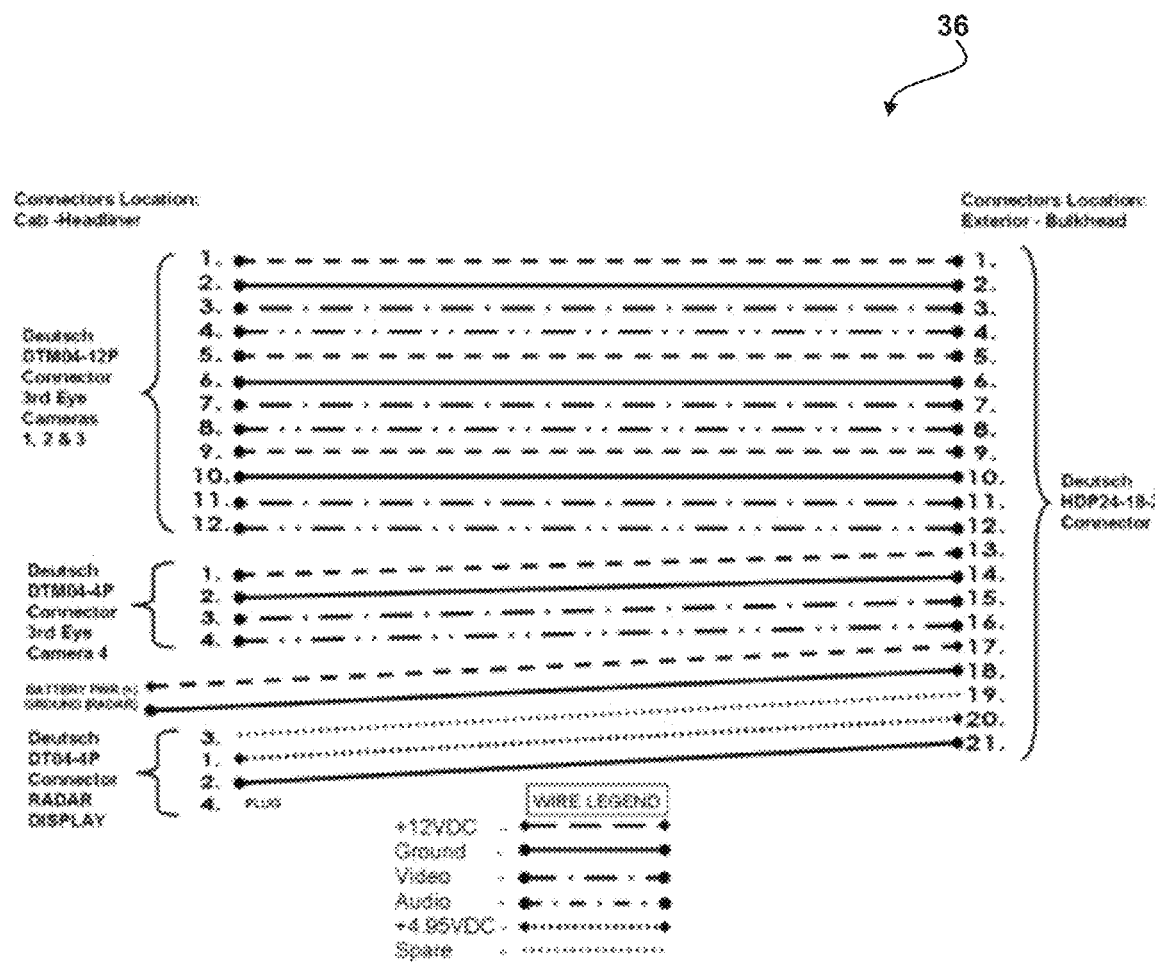
FIG. 5 illustrates a signal flow diagram with respect to a custom multi-conductor cable, in accordance with the disclosed embodiments.

With the disclosed example embodiments, the communication between the truck cab interior and exterior truck chassis is adaptable, convenient and simple to install, and integrate with, for example, video, audio, radar, and data components in the context of a single harness. In FIG. 5, a signal flow diagram 36 demonstrates preferred connection paths for video, audio, radar, and support cameras to the single twenty-one cable bundle in the second multi-conductor cable 48, in accordance with an example embodiment.

Thus, one or more of the disclosed example embodiments establishes electrical connections between various circuits and functions that may be found in the truck, including and without limitation DC low voltage battery power sources, battery ground, video, audio and data signals, video imaging sensors, object detection radar sensors, and various other on-board information technologies that may be incorporated into a truck.

It will be understood that each of the elements described above, or two or more together, may also find a useful application in other types of constructions differing from the types described above.

While the invention has been illustrated and described as embodiments of a method and apparatus for communicating between cab interior and exterior of chassis of a truck, accordingly it is not limited to the details shown since it will be understood that various omissions, modifications, substitutions, and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

What is claimed is:

1. An apparatus for communicating between a truck cab interior and an exterior chassis of a truck, said apparatus comprising: at least one multi-conductor cable having a plurality of circuits, wherein said multi-conductor extends the length of said truck cab interior and said exterior chassis of said truck to carry communication functions between said truck cab interior and a distal end of said exterior chassis of said truck, wherein said multi-conductor cable comprises a first multi-conductor cable for connecting a proximal end of said exterior chassis of a truck and said distal end of said chassis of a truck and a second multi-conductor cable for connecting said exterior proximal end of said chassis of a truck and said truck cab interior, wherein said first multi-conductor cable comprises a first cable bundle having a first socket connector at said proximal end of said chassis of a truck and a first pin connector at said distal end of said chassis of a truck, and wherein said first pin connector is electrically connected to a wiring system at said distal end of said chassis of a truck.

2. The apparatus of claim 1 wherein said second multi-conductor cable comprises a second cable bundle having a second pin connector at said proximal end of said chassis of a truck connected to said first socket connector and a second socket connector at said truck cab interior, wherein said second socket connector is electrically connected to a wiring system in said truck cab interior.

3. The apparatus of claim 2 wherein said second multi-conductor cable is fabricated into a harness of a length that is truck brand and model specific determined by the truck manufacturer.

4. The apparatus of claim 3 wherein said first multi-conductor cable comprises a first cable bundle having a first socket connector at said proximal end of said chassis of a truck and a first pin connector at said distal end of said chassis of a truck, wherein said first pin connector is electrically connected to a wiring system at said distal end of the chassis of a truck.

5. The apparatus of claim 3 wherein said second multi-conductor cable comprises a second cable bundle having a second pin connector at said proximal end of said chassis of a truck connected to said first socket connector and a second socket connector at said truck cab interior, wherein said second socket connector is electrically connected to a wiring system in said truck cab interior.

6. The apparatus of claim 1 wherein said second multi-conductor cable is fabricated into a harness of a length that is truck brand and model specific determined by the truck manufacturer.

7. A method for communicating between a truck cab interior and an exterior chassis of a truck comprising the steps of:
   a) mounting at least one multi-conductor cable comprising a first multi-conductor cable and a second multi-conductor cable, wherein said multi-conductor cable comprises a plurality of circuits and extends the length of said truck cab interior and said exterior chassis of a truck;

b) electrically connecting a first pin connector of said first multi-conductor cable to a wiring system at a distal end of said exterior chassis of a truck and a second pin connector of said second multi-conductor cable to a wiring system inside said truck cab interior;

c) electrically connecting said second pin connector of said second multi-conductor cable to a first socket of said first multi-conductor cable; and d) allowing said multi-conductor cable to carry various communication functions between said truck cab interior and said distal end of said exterior chassis of a truck, wherein said second multi-conductor cable is fabricated into a harness of a length that is truck brand and model specific determined by the truck manufacturer.

8. A system for communicating between a truck cab interior and an exterior chassis of a truck, said system comprising: at least one multi-conductor cable having a plurality of circuits, wherein said multi-conductor cable extends the length of said truck cab interior and said exterior chassis of said truck to carry communication functions between said truck cab interior and a distal end of said exterior chassis of said truck, wherein said multi-conductor cable comprises a first multi-conductor cable for connecting a proximal end of said exterior chassis of a truck and said distal end of said chassis of a truck and a second multi-conductor cable for connecting said exterior proximal end of said chassis of a truck and said truck cab interior, and wherein said first multi-conductor cable comprises a first cable bundle having a first socket connector at said proximal end of said chassis of a truck and a first pin connector at said distal end of said chassis of a truck, wherein said first pin connector is electrically connected to a wiring system at said distal end of said chassis of a truck.

9. The system of claim 8 wherein said second multi-conductor cable comprises a second cable bundle having a second pin connector at said proximal end of said chassis of a truck connected to said first socket connector and a second socket connector at said truck cab interior, wherein said second socket connector is electrically connected to a wiring system in said truck cab interior.

10. The system of claim 9 wherein said second multi-conductor cable is fabricated into a harness of a length that is truck brand and model specific determined by the truck manufacturer.

11. The system of claim 10 wherein said first multi-conductor cable comprises a first cable bundle having a first socket connector at said proximal end of said chassis of a truck and a first pin connector at said distal end of said chassis of a truck, wherein said first pin connector is electrically connected to a wiring system at said distal end of the chassis of a truck.

12. The system of claim 10 wherein said second multi-conductor cable comprises a second cable bundle having a second pin connector at said proximal end of said chassis of a truck connected to said first socket connector and a second socket connector at said truck cab interior, wherein said second socket connector is electrically connected to a wiring system in said truck cab interior.

13. The system of claim 8 wherein said second mufti-conductor cable is fabricated into a harness of a length that is truck brand and model specific determined by the truck manufacturer.

* * * * *